US008744731B2

(12) United States Patent
Wertz et al.

(10) Patent No.: US 8,744,731 B2
(45) Date of Patent: Jun. 3, 2014

(54) ELECTRONIC DIGITAL GOVERNOR AND METHOD OF ASSEMBLY

(75) Inventors: Dan Wertz, Columbia, CT (US); Kevin A. Batson, Agawam, MA (US); Dae Kon Yi, Springfield, MA (US); Sean Lavin, Feeding Hills, MA (US); Paul Cappa, Enfield, CT (US)

(73) Assignee: Governors America Corp., Agawam, MA (US)

( * ) Notice: Subject to any disclaimer, the term of this patent is extended or adjusted under 35 U.S.C. 154(b) by 139 days.

(21) Appl. No.: 13/292,472

(22) Filed: Nov. 9, 2011

(65) Prior Publication Data

US 2012/0123664 A1 May 17, 2012

Related U.S. Application Data

(60) Provisional application No. 61/413,693, filed on Nov. 15, 2010.

(51) Int. Cl.
*G05B 19/10* (2006.01)
*G05B 11/01* (2006.01)

(52) U.S. Cl.
USPC ........... 701/110; 701/115; 123/351; 123/361; 123/399; 290/1 R; 290/51; 700/17

(58) Field of Classification Search
USPC ............. 701/110, 115; 290/1 R, 51; 123/350, 123/351, 361, 399; 700/17, 18
See application file for complete search history.

(56) References Cited

U.S. PATENT DOCUMENTS

| | | | | |
|---|---|---|---|---|
| 3,692,157 | A * | 9/1972 | Arnold et al. | 477/2 |
| 5,754,033 | A * | 5/1998 | Thomson | 322/45 |
| 5,803,043 | A * | 9/1998 | Bayron et al. | 123/335 |
| 6,061,617 | A * | 5/2000 | Berger et al. | 701/50 |
| 6,107,927 | A * | 8/2000 | Dvorsky et al. | 340/658 |
| 6,351,692 | B1 * | 2/2002 | Eaton et al. | 700/287 |
| 6,582,340 | B1 * | 6/2003 | Arie et al. | 477/97 |
| 6,741,925 | B2 * | 5/2004 | Masters et al. | 701/115 |
| 6,912,889 | B2 * | 7/2005 | Staphanos et al. | 73/23.31 |
| 7,107,130 | B2 * | 9/2006 | Kondo et al. | 701/1 |
| 7,155,321 | B2 * | 12/2006 | Bromley et al. | 701/29.6 |
| D543,950 | S * | 6/2007 | Ludlum et al. | D13/162 |
| 7,379,801 | B2 * | 5/2008 | Heffington | 701/29.6 |
| 7,825,641 | B2 * | 11/2010 | Eaton et al. | 322/29 |
| 7,865,288 | B2 * | 1/2011 | Fukushima et al. | 701/54 |
| 8,224,512 | B1 * | 7/2012 | Dengel et al. | 701/21 |
| 8,306,521 | B2 * | 11/2012 | Ban | 455/419 |
| 8,400,001 | B2 * | 3/2013 | Eaton et al. | 290/40 C |
| 8,494,750 | B2 * | 7/2013 | Wyatt et al. | 701/102 |
| 2008/0195299 | A1 * | 8/2008 | Barnicle et al. | 701/115 |

FOREIGN PATENT DOCUMENTS

| | | |
|---|---|---|
| CN | 2032779 | 2/1989 |
| CN | 2422777 | 3/2001 |

* cited by examiner

*Primary Examiner* — Erick Solis

(74) *Attorney, Agent, or Firm* — McCormick Paulding & Huber LLP

(57) ABSTRACT

An electronic digital governor assembly includes a case, a printed circuit board housed within said case, the printed circuit board having control circuitry configured for controlling at least one parameter of an energy production device, and a user interface including a digital display for displaying a value of the at least one parameter and at least one button for selectively adjusting the value.

18 Claims, 8 Drawing Sheets

ELECTRONIC DIGITAL GOVERNOR AND METHOD OF ASSEMBLY

CROSS REFERENCE TO RELATED APPLICATIONS

This application claims the benefit of U.S. Provisional Application Ser. No. 61/413,693, filed on Nov. 15, 2010, entitled "ELECTRONIC DIGITAL GOVERNOR," which is hereby incorporated by reference in its entirety.

FIELD OF THE INVENTION

The present invention relates generally to speed control devices and, more particularly, to an electronic digital governor for controlling functional parameters of a generator or reciprocating engine.

BACKGROUND OF THE INVENTION

Known governors are generally analog in nature and utilize analog controllers that control potentiometers to control various functions of energy production devices, such as generators and reciprocating engines. For example, such governors are designed to control the speed of the generator/engine through the adjustment of one or more knobs or similar mechanical means. Generally these known analog governors have a separate knob for controlling each individual operational parameter of the generator or engine. As will be readily appreciated, however, controlling generator/engine parameters though knobs is generally imprecise, as a user cannot see the exact value that is being set for a given parameter.

In view of the above, there is a need for a governor that allows for the precise adjustment of various operational parameters utilizing a single button or a single set of controls. In addition, it is desirable to provide a governor having an display readout so that a user can see exactly the value of an operational parameter being set.

SUMMARY OF THE INVENTION

It is an object of the present invention to provide an electronic digital governor.

It is another object of the present invention to provide an electronic digital governor having an intuitive user interface.

It is another object of the present invention to provide an electronic digital governor that can replace existing mechanical governor systems.

It is another object of the present invention to provide an electronic digital governor that allows for the precise adjustment of various operational parameters utilizing a single set of controls.

It is another object of the present invention to provide an electronic digital governor that allows for engine speed control.

It is yet another object of the present invention to provide an electronic digital governor that is sealed to prevent permeation of potting compounds and moisture.

It is yet another object of the present invention to provide an electronic digital governor that can be operated in temperatures as low as −40 degrees Celsius.

It is yet another object of the present invention to provide an electronic digital governor that is tolerant to component stack-up issues.

It is yet another object of the present invention to provide an electronic digital governor that has improved heat dissipation compared to existing devices.

These and other objectives of the present invention, and their preferred embodiments, shall become clear by consideration of the specification, claims and drawings taken as a whole.

An electronic digital governor assembly according to an embodiment of the present invention includes a case, a printed circuit board housed within said case and having control circuitry configured for controlling at least one parameter of an energy production device, and a user interface including a digital display for displaying a value of the at least one parameter and at least one button for selectively adjusting the value of the parameter.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
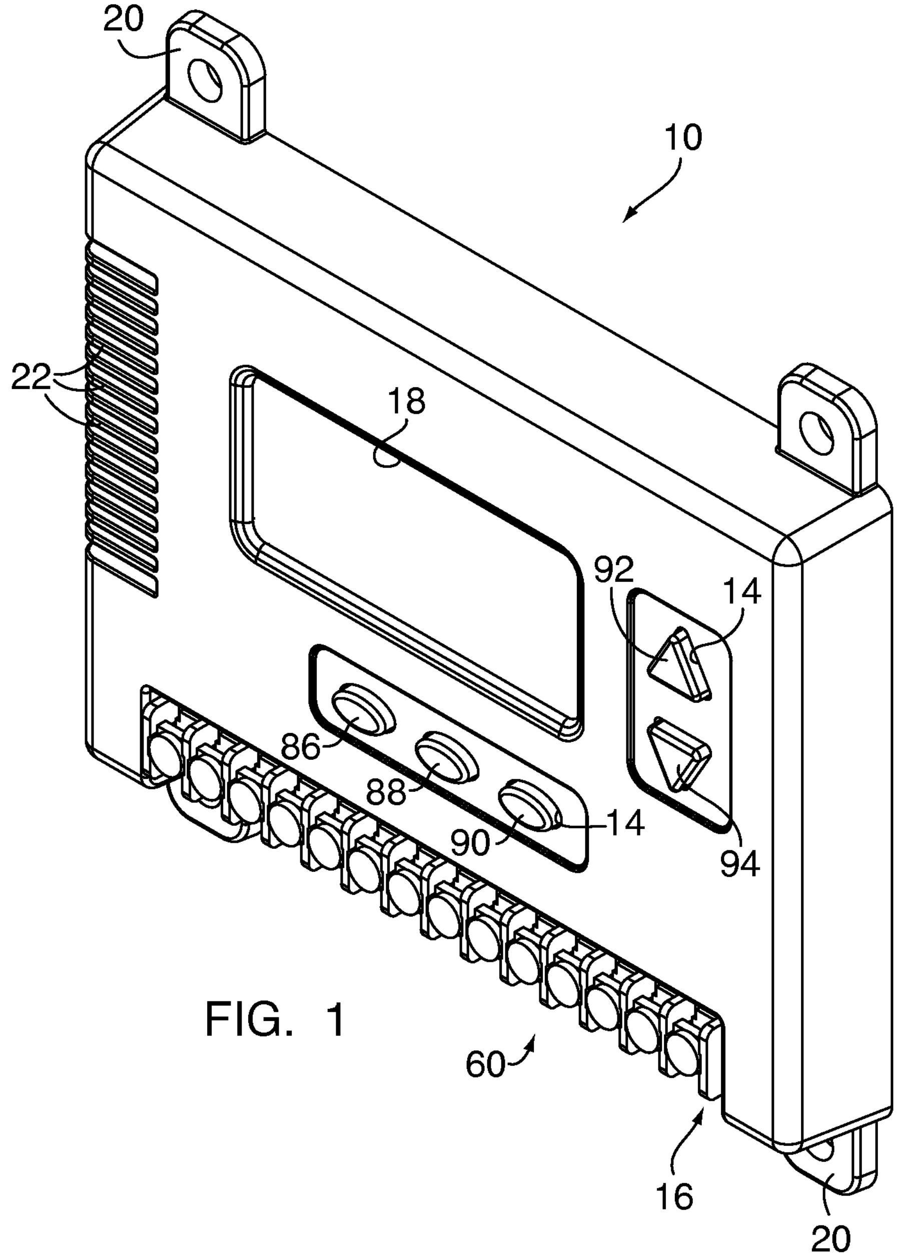
FIG. 1 is a front, perspective view of an electronic digital governor in accordance with an embodiment of the present invention.
Figure 2:
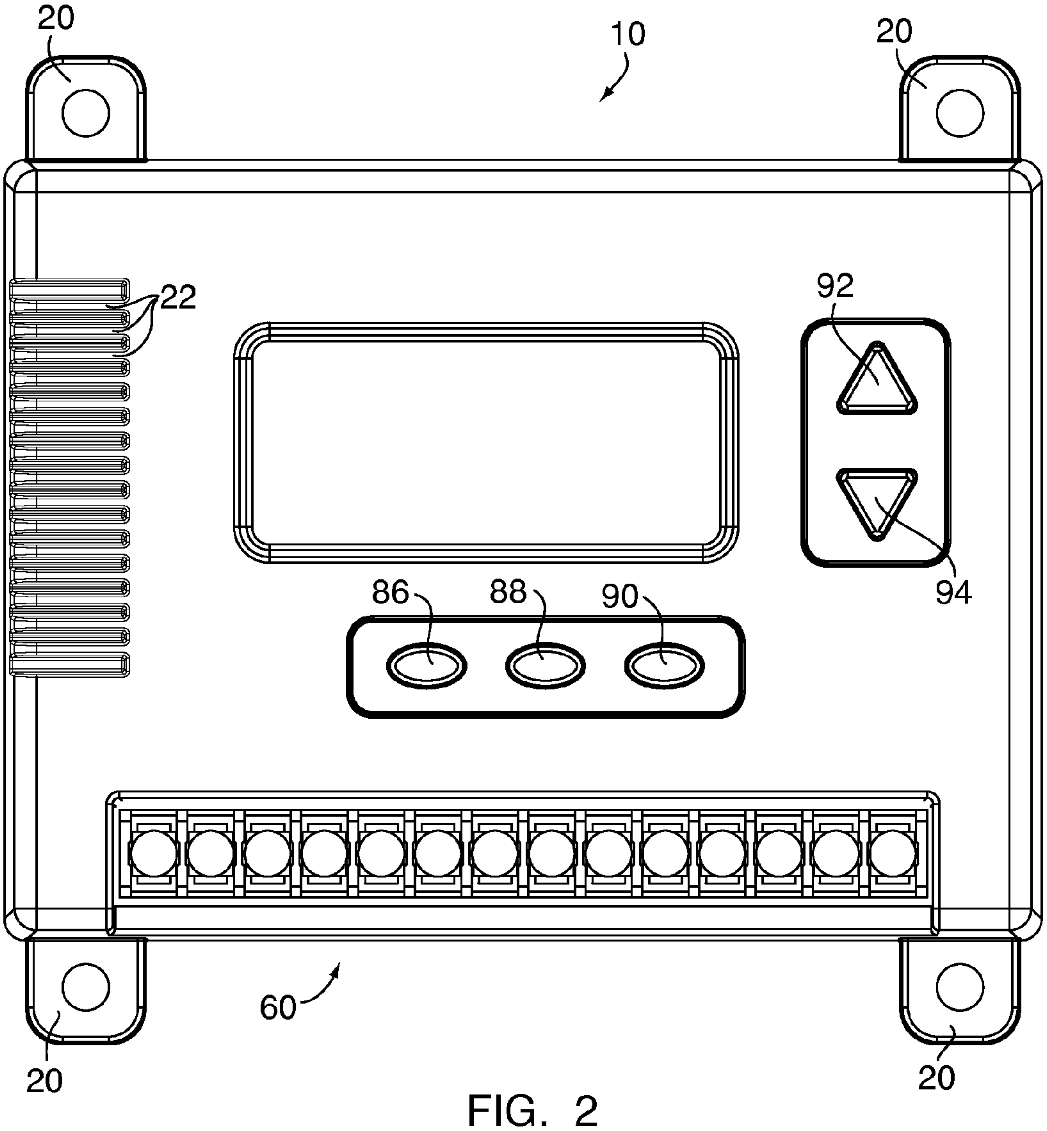
FIG. 2 is a front elevational view of the electronic digital governor of FIG. 1.

FIGS. 1 and 2 illustrate an electronic digital governor 10 according to one embodiment of the present invention. As shown therein, the governor includes a generally rectangular outer case 12 having a plurality of apertures 14 formed therein through which various buttons of a keypad are provided to control operation of the governor 10, as discussed hereinafter. The case 12 also includes a rectangular opening 16 adjacent the bottom thereof to permit access to a terminal block secured to the circuit board of the governor 10, and a generally rectangular aperture 18 formed in the center of the case 12 for a digital display. As further shown in FIG. 1, the case 12 has a plurality of tabs 20 for mounting the governor 10 in a control cabinet or engine mounted enclosure. In an embodiment, the governor 10 is engine compartment mountable. In addition, the case 12 is also formed with a plurality of fins 22 for dissipating heat from the circuit board, as discussed below.

Figure 3:
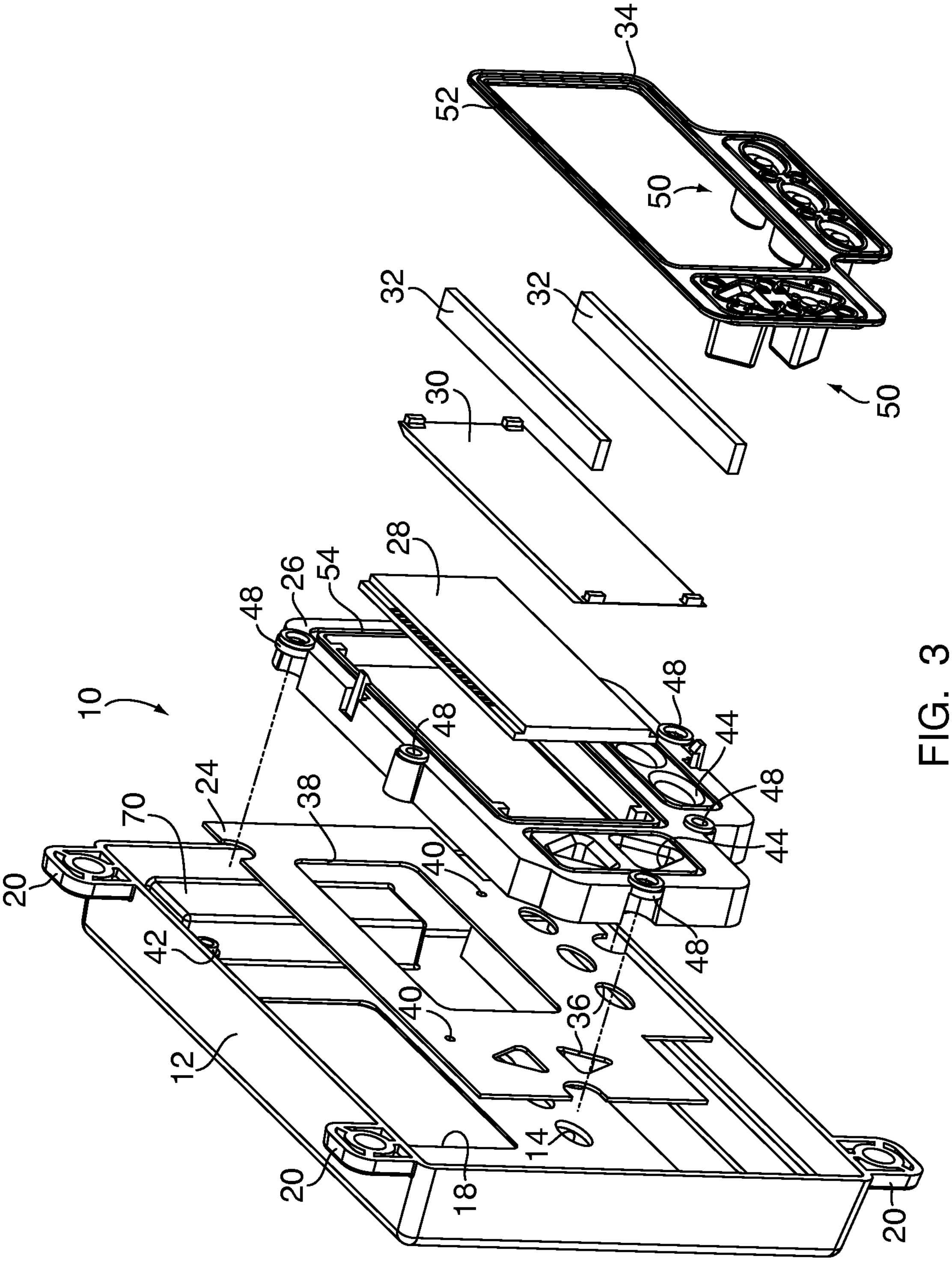
FIG. 3 is an exploded, perspective view of the electronic digital governor, shown without a printed circuit board (PCB).

With reference to FIG. 3, the internal components and the alignment of such components within the case 12 is shown. In particular, the governor 10 includes a gasket 24, a polycarbonate plate 26, a LCD display 28, a LCD back plate 30, a pair of elastomeric connectors 32 and a keypad 34. The gasket 24 includes a plurality of apertures sized, shaped and positioned to correspond to the apertures 14, 18 formed in the case 12. In particular, the gasket 24 includes apertures 36 for the buttons of the keypad 34 and an aperture 38 for the LCD display 28. The gasket 24 is seated against the housing and is located in place by pins (not shown) on the case 12 that are received in locating holes 40 formed in the gasket 24, and by a plurality of internally threaded posts 42 integrally formed with the case 12. In an embodiment, one or more of the posts 42 may be stepped.

As further shown in FIG. 3, the polycarbonate plate 26 also includes apertures 44 that correspond to the size and shape of the apertures 36 in the gasket 24 and the apertures 14 in the case 12. The plate 26 is also formed with a transparent window 46 that is aligned with aperture 38 of the gasket and aperture 18 of the case. As will be readily appreciated, the transparent window 46 protects the LCD display 28 which is positioned behind the window 46 from moisture permeation and from impact by debris. The plate 26 is formed with a plurality of stepped bosses 48 that are aligned with the threaded posts 42 of the case 12. During assembly, the stepped bosses 48 are received on the threaded posts 42 to properly position the plate 26 with respect to the case 12 and the gasket 24. As discussed in detail below, the gasket 24 provides a substantially air tight and water tight seal between the polycarbonate plate 26 and the case 12 such that no moisture or debris can the interior of the case 12 through the LCD aperture 18.

With further reference to FIG. 3, the LCD 28 display is generally rectangular in shape and is designed to fit within the transparent window 46 of the polycarbonate plate 46 such that the display 28 is visible from the front of the governor 10 through aperture 18. While the preferred embodiment of the present invention utilizes a LCD display, other types of displays known in the art, such as LED and the like, may also be used without departing from the broader aspects of the present invention. Once the LCD display 28 is positioned within the window 46, the LCD back plate 30 is laid on top of it. Elastomeric connectors 32 are received in a space above and below the back plate 30. The elastomeric connectors 32 may be ZEBRA connectors or other types of connectors known in the art, and are utilized to connect the LCD display 28 to the circuit board.

The keypad 34 includes a plurality of buttons 50 that are sized and shaped so as to be received through apertures 44 in the plate 26, apertures 36 in the gasket 24 and apertures 14 in the case 12. The buttons 50 protrude from the front of the case 12 so that they be accessed by a user to control operation of the governor 10, as discussed below. In the preferred embodiment, the keypad 34 is formed from an elastomeric material. Importantly, the keypad 34 also has a gasket 52 extending around a periphery thereof that is received in a correspondingly shaped track 54 in the polycarbonate plate 26. As will be readily appreciated, the engagement of the gasket 52 within the track 54 serves to properly locate the keypad 34 within the case 12. In addition, this engagement also creates an air-tight and moisture-tight seal so that any moisture or debris is prevented from entering the governor 10 through the button apertures 14 in the case 12.

Figure 4:
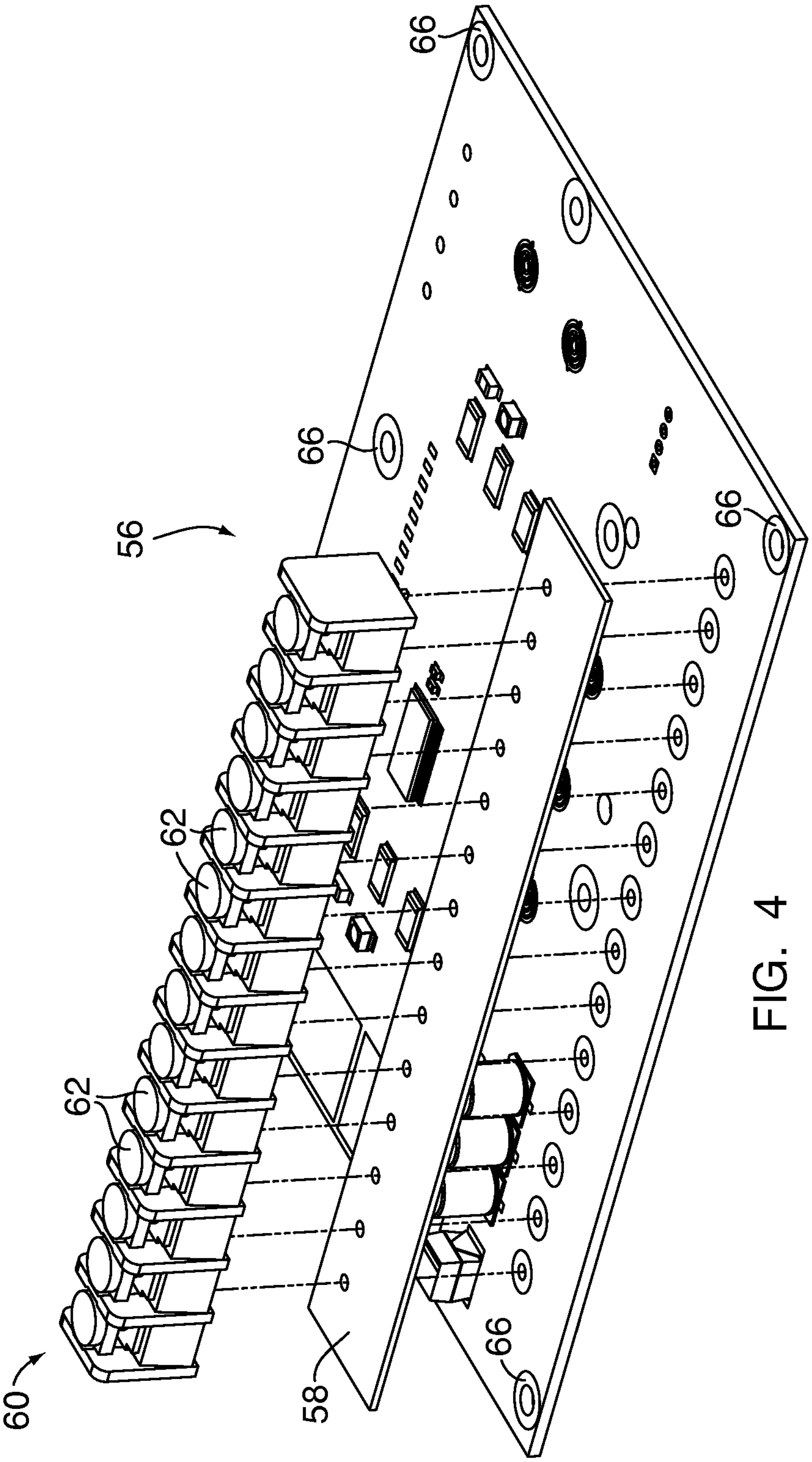
FIG. 4 is an exploded, perspective view of the PCB and terminal block of the electronic digital governor of FIG. 1.
Figure 5:
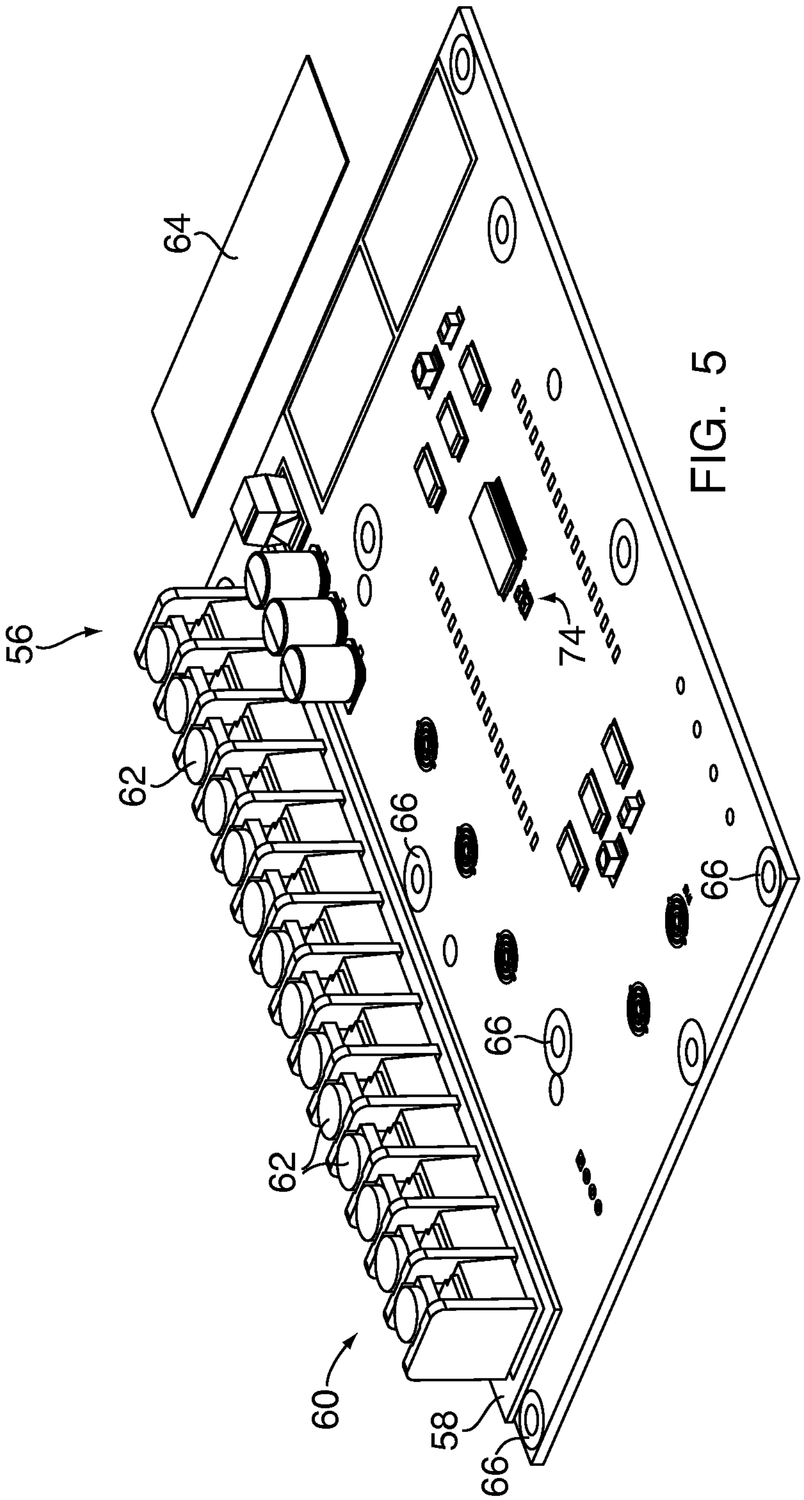
FIG. 5 is a perspective view of the PCB and terminal block of the electronic digital governor of FIG. 1, shown in an assembled state.
Figure 6:
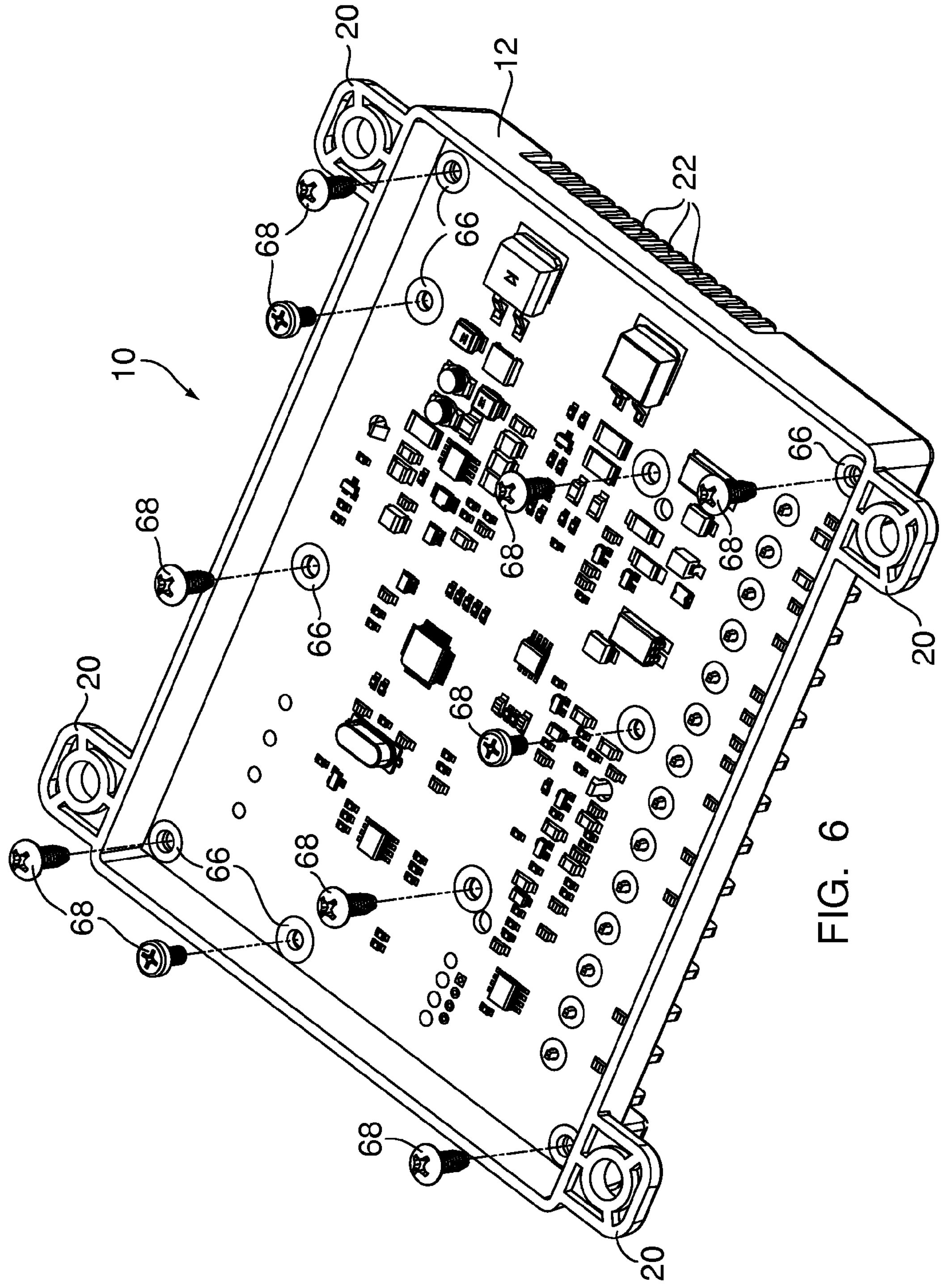
FIG. 6 is a rear, perspective view of the electronic digital governor of FIG. 1, showing the PCB seated in the casing.

Turning now to FIGS. 4 and 5, the construction of the printed circuit board (PCB) 56 of the governor 10 is shown. The circuit board 56 is generally of the type known in the art and includes a gasket connector 58 on top of which a terminal block 60 having a plurality of terminals 62 is mounted. A thermal strip or a section of thermal tape 64 is disposed on a portion of the circuit board 56. The circuit board 56 also includes a plurality of screw apertures 66 sized to receive screws 68, as shown in FIG. 6. The screw apertures 66 are located so as to align with the threaded posts 42 of the case 12.

As shown in FIG. 6, the circuit board 56 is received within the case 12 after the other components have been stacked therein, such that the terminal block 60 protrudes through the opening 16 in the front of the case. A plurality of screws 68 are inserted through the screw apertures 66 in the circuit board 56 and are received in the threaded posts 42. The screws 68 are then torqued down to secure the circuit board 56 to the case 12.

In connection with securing the circuit board 56 to the case 12, the stepped bosses 48 of the polycarbonate plate 26 are an important aspect of the present invention. In particular, the stepped bosses 48 provide a crush feature that eliminates stack up issues, allows the circuit board 56 to sit line to line with the case 12 and provides a pre-load for the gasket 52 integrated with the elastomeric keypad 34.

Notably, if there are any tolerance issues with the stacked components, some of the components may not be properly seated. As the screws 68 are torqued down, however, the stepped bosses 48 of the polycarbonate plate 26 crush or yield so that the thermal tape 64 of the circuit board 56 comes into direct contact with a raised land 70 formed on the back of the case 12. As will be readily appreciated, heat generated through normal operation is directed to the thermal tape 64 and transferred, through conduction, to the raised land 70 of the case. The heat transferred to the raised land 70 is then dissipated through the fins 22 formed in the front of the case 12. As will be readily appreciated, then, the crush feature provided by the stepped bosses 48 ensure that all of the components are properly aligned and seated and compensate for any dimensional inaccuracies in manufacturing of the components. In this manner, it also ensues that the elastomeric connectors 32, the buttons 50 and back of the keypad 34 are in contact with the circuit board 56.

Figure 7:
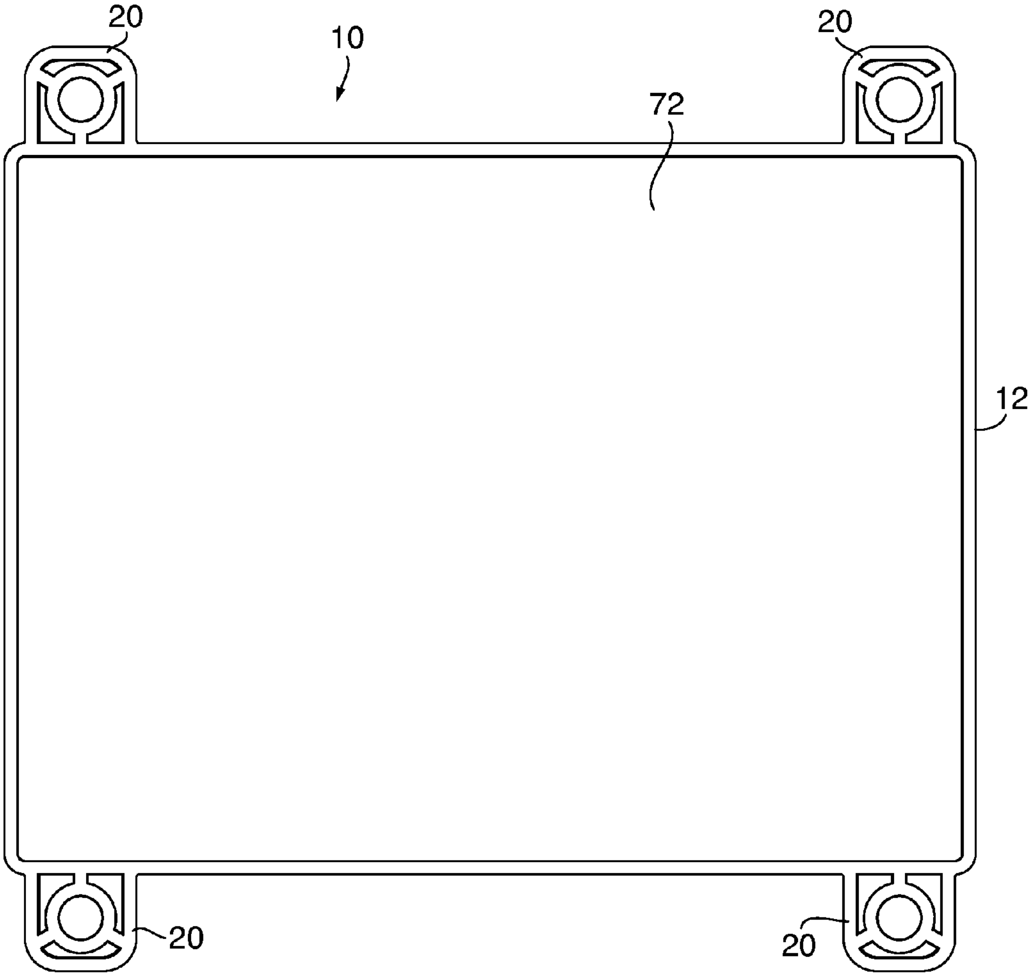
FIG. 7 is a rear elevational view of the electronic digital governor of FIG. 1, showing a potting compound encasing the PCB.

Once the circuit board 56 is installed and torqued down so that the thermal tape 64 comes into direct contact with the raised land 70 of the case 12, a potting compound 72 is poured on the back side of the case 12, as shown in FIG. 7, to completely seal the internal components, including the circuit board 56, within the case 12. Notably, because of the various seals, such as gasket 52 and the seal between the polycarbonate plate 26 and gasket 24, the potting compound 72 is unable to penetrate the display 28 or the buttons 50. Accordingly, this obviates the need for masking, which is necessary when potting existing electronic devices.

Importantly, as discussed above, the LCD display 28 is in a sealed cavity between the polycarbonate plate 26, the elastomeric keypad 34 and the circuit board 56 (contact between the keypad 34 and circuit board 56 creates an air-tight and moisture-tight seal. A temperature sensor (not shown) on the circuit board 56 within this cavity monitors a temperature within the cavity during operation of the governor 10. If the temperature within the cavity drops below a predetermined value necessary for proper operation, the sensor will detect this drop and a processor will direct heat to resistors 74 on the circuit board 56 (also within the cavity) to heat the cavity to a sufficient operating temperature. As a result, the governor 10 of the present invention is capable of operating in temperatures reaching −40 degrees Celsius.

Figure 8:
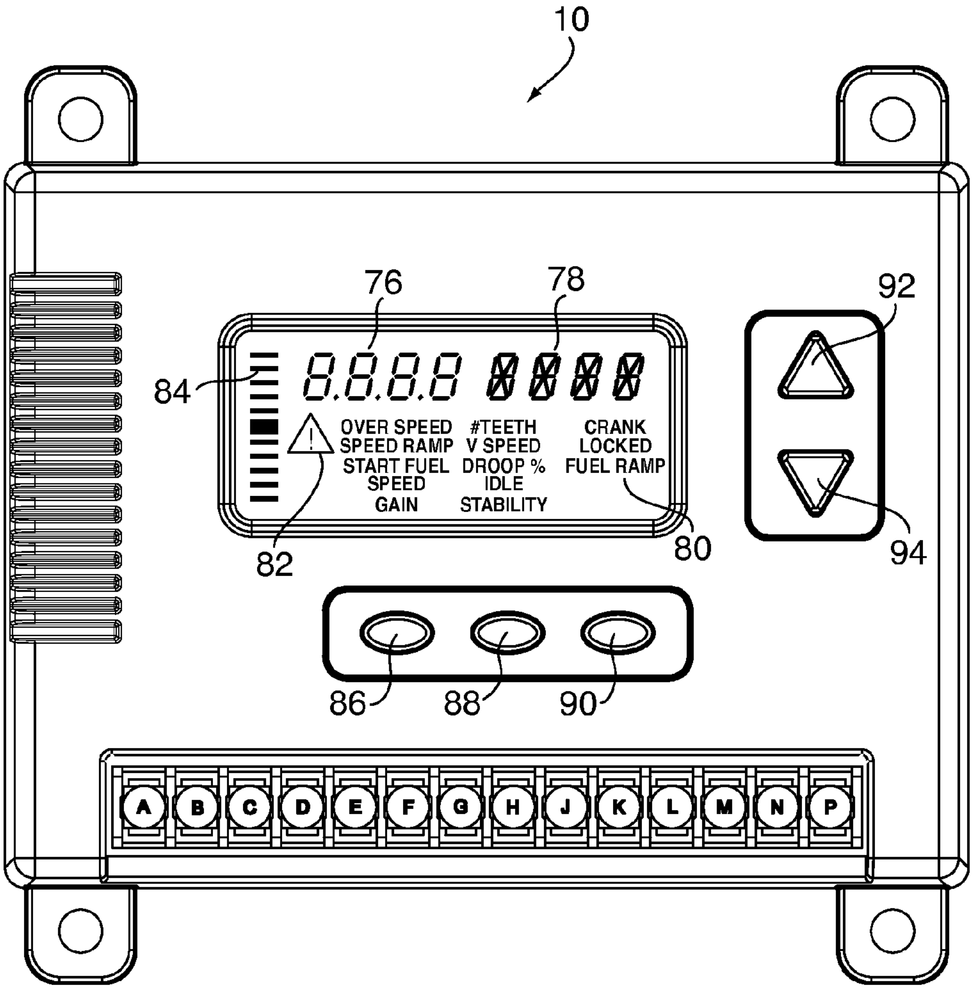
FIG. 8 is a front elevational view of the electronic digital governor of FIG. 1, showing a user interface thereof.

The governor 10, and the circuit board 56 in particular, contains control circuitry to control operation of an engine or governor, as alluded to above. In particular, the governor has an advanced microprocessor with enough computational power, memory, and I/O support (through the terminal block 60) to support an enhanced PID control loop, user interface and an optional J1939 Bus interface. To install the governor 10 an actuator and battery are connected to terminals A, B, E and F of the terminal block 60, as shown in FIG. 8. Magnetic speed sensor wires are connected to terminals C and D of the terminal block 60. The governor 10 detects the speed of the generator or engine by picking up the gear teeth on the flywheel of the generator or engine, and outputs a signal to control fuel rack. In particular, fuel rack may be adjusted through the user interface in dependence on the measured/detected speed. Importantly, the electronic digital governor 10 constantly monitors the magnetic pickup for speed detection.

The user interface is an important aspect of the present invention. As discussed above, existing governors are analog in nature and engine parameter adjustment has been effectuated by turning various small knobs. In stark contrast, the present invention is digital and provides a user interface having a quickset menu system. In an embodiment, upon starting the engine, the three most required parameters, gain stability and deadtime, appear on the display 28 and are immediately accessible. As will be readily appreciated, in contrast to existing analog governors, the LCD display 28 of the governor 10 of the present invention allows a user to read the exact speed of the engine from the front of the device, in real time. In addition, the governor 10 of the present invention allows a user to see the percent throttle (i.e., percent modulation of fuel), current to the actuator, etc., which is simply not possible with existing analog devices.

As shown in FIG. 8, the LCD display 28 has a variety of data or parameter fields including a numerical field 76 for displaying parameter numerical values, an alphanumeric field 78, a parameter menu 80, a warning indicator 82 and a throttle or delta speed graph 84. On the display 28, a user may modify a parameter by pressing and holding the appropriate column button 86, 88, 90 while simultaneously pressing either the UP and DOWN arrow 92, 94, respectively, to increase or decrease the value accordingly. Importantly, the user interface provides for the incremental tuning of parameters, with intuitive acceleration when a button is held down for a duration. To prevent unauthorized access to the governor 10, the user interface can be locked. The governor control circuitry may automatically time out the display, should an operator leave it unattended.

As discussed above, the user interface can display throttle percent or the difference in commanded and actual speed. Moreover, droop max load, as measured by the current actuator, is settable. Importantly, and in contrast to existing analog governors, the governor 10 of the present invention can be used with a wide range of actuators.

During operation, while governing, the governor 10 will display the current RPM and the percent of throttle being applied. The RPM is displayed in the alpha numeric area 78 and the percent throttle is on the graph 84. By pressing either the UP or DOWN arrow, the user can change the alphanumeric area 78 to display the numerical percent throttle (in which case the bar graph 84 will then represent the difference between the actual RPM and the desired RPM).

As noted above, the governor 10 and its control circuitry provide switch inputs for droop and idle and a standard accessory input for connecting to load sharing/synchronizing controls. In addition to the above, the electronic digital governor 10 contains START FUEL and FUEL RAMP settings to eliminate or reduce black smoke during startup. START FUEL represents the initial power to apply to the actuator during cranking (e.g., 0% for fully closed, 50% for half open, 100% for fully open, etc.). FUEL RAMP represents how fast to apply fuel as the engine starts. As will be readily appreciated, the ability to precisely adjust these settings is crucial, as poor PID settings can affect the response.

The governor 10 also has a variable speed/trim input which accepts a 5 kOhm potentiometer. Generally, the trim function may be utilized to perform finer adjustments such as in generator frequency. Variable speed is used to operated in a larger RPM range. An accessory input (M in FIG. 2) on the terminal block 60 accepts input signals from load sharing units, auto synchronizers, and other governor system accessories.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An electronic digital governor assembly, comprising:

a case;

a polycarbonate plate;

a gasket intermediate said case and said polycarbonate plate;

a keypad containing at least one button;

a printed circuit board housed within said case, said printed circuit board having control circuitry configured for controlling at least one parameter of an energy production device; and a user interface including a digital display for displaying a value of said at least one parameter and said at least one button for selectively adjusting said value;

wherein said polycarbonate plate, said keypad and said printed circuit board define a substantially air-tight and moisture-tight cavity; and wherein said digital display is contained within said cavity.

2. The electronic digital governor assembly of claim 1, wherein:

said digital display is a liquid crystal display.

3. The electronic digital governor assembly of claim 1, wherein:

said polycarbonate plate includes a plurality of crush zones, said crush zones being deformable from a first position in which a portion of said printed circuit board is spaced from a raised land formed on said case, to a second position in which said portion of said printed circuit board is in direct contact with said raised land.

4. The electronic digital governor assembly of claim 1, wherein:

said case includes a plurality of fins for dissipating heat generated during operation of said governor.

5. The electronic digital governor assembly of claim 1, further comprising:

a terminal block electrically connected to said circuit board, said terminal block having a plurality of electrical terminals.

6. The electronic digital governor assembly of claim 1, further comprising:

a temperature sensor in communication with said cavity and configured to detect a temperature with said cavity; and at least one resistor in communication with said cavity and being operable to provide heat to said cavity in dependence upon a said detected temperature within said cavity.

7. The electronic digital governor assembly of claim 1, wherein:

said assembly is engine compartment mountable.

8. An electronic digital governor, comprising:

a housing defining a cavity;

a plate having a transparent window disposed within said cavity;

a printed circuit board having a microprocessor and control circuitry configured to control at least one operating parameter of an energy production device; and a user interface including a digital display for displaying a value of said at least one operating parameter and at least one button for selectively adjusting said value, said digital display being aligned with said window;

wherein said plate includes a plurality of crush zones, said crush zones being deformable from a first position in which a portion of said printed circuit board is spaced from a raised land formed on said housing, to a second position in which said portion of said printed circuit board is in direct contact with said raised land.

9. The electronic digital governor of claim 8, wherein:

said control circuitry continuously monitors said at least one operating parameter of said energy production device; and said digital display displays said at least one parameter in real time.

10. The electronic digital governor of claim 9, wherein:

said at least one operating parameter is one of speed, current to actuator and percent throttle.

11. The electronic digital governor of claim 9, wherein:

said at least one operating parameter is one of gain, stability and deadtime.

12. The electronic digital governor of claim 8, wherein:

said digital display is a liquid crystal display.

13. The electronic digital governor of claim 8, wherein:

said control circuitry includes a single PID control loop that incorporates starting fuel and speed control.

14. The electronic digital governor wherein:

said digital display includes a multi-function graph configured to display one of throttle percent and difference in commanded and actual speed.

15. A method of manufacturing an electronic digital governor, said method comprising the steps of:

providing a case defining a cavity;

positioning a plate within said cavity, said plate having a transparent window;

positioning a digital display within said window;

positioning a keypad having an integral gasket into registration with said plate;

positioning a printed circuit board having control circuitry within said cavity; and securing said printed circuit board to said case to provide a substantially air-tight and moisture-tight seal around said digital display.

16. The method according to claim 15, wherein:

said plate includes a plurality of yield zones, said yield zones being collapsible from a first position in which a portion of said printed circuit board is spaced from a raised land formed on said case, to a second position in which said portion of said printed circuit board is in direct contact with said raised land when said printed circuit board is secured to said case.

17. The method according to claim 15, further comprising the step of:

depositing a potting compound within said cavity to substantially seal said plate, display, keypad and circuit board within said cavity and to provide a generally smooth rear surface.

18. The method according to claim 15, further comprising the step of:

positioning a temperature sensor and a resistor on said circuit board adjacent said digital display.

* * * * *